United States Patent
Barnett et al.

(10) Patent No.: US 11,750,872 B2
(45) Date of Patent: *Sep. 5, 2023

(54) SYSTEM AND METHOD FOR CONFIGURING CONTROLLING DEVICE FUNCTIONALITY

(71) Applicant: Universal Electronics Inc., Scottsdale, AZ (US)

(72) Inventors: Brian Barnett, Oakland, CA (US); Arsham Hatambeiki, San Diego, CA (US); Rex Xu, Tustin, CA (US); Jesus Perez, Costa Mesa, CA (US)

(73) Assignee: Universal Electronics Inc., Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/709,603

(22) Filed: Mar. 31, 2022

(65) Prior Publication Data

US 2022/0224964 A1 Jul. 14, 2022

Related U.S. Application Data

(63) Continuation of application No. 17/217,587, filed on Mar. 30, 2021, now Pat. No. 11,405,677, which is a
(Continued)

(51) Int. Cl.
*H04N 21/422* (2011.01)
*H04N 5/765* (2006.01)
(Continued)

(52) U.S. Cl.
CPC ....... *H04N 21/42204* (2013.01); *H04N 5/765* (2013.01); *H04N 5/775* (2013.01);
(Continued)

(58) Field of Classification Search
None
See application file for complete search history.

(56) References Cited

U.S. PATENT DOCUMENTS 4,959,810 A 9/1990 Darbee et al.
5,481,256 A 1/1996 Darbee et al.
(Continued)

OTHER PUBLICATIONS

Int. Searching Authority/US, Int. Search Report and Written Opinion of PCT Appln. No. US2012/54372, dated Nov. 27, 2012, 15 pgs.
(Continued)

*Primary Examiner* — Samira Monshi
(74) *Attorney, Agent, or Firm* — Greenberg Traurig, LLP

(57) ABSTRACT

A controlling device is automatically configured to issue a communication directly to a first controllable appliance to control a functional operation of the first controllable appliance in the event that the first controllable appliance is determined to be unresponsive to a command communication transmitted to the first controllable appliance via a digital communications link or to issue a communication to a second controllable appliance to control the functional operation of the first controllable appliance via a digital communications link in the event that first controllable appliance is determined to be responsive to a command communication transmitted to the first controllable appliance via a digital communications link.

16 Claims, 6 Drawing Sheets

Related U.S. Application Data continuation of application No. 15/455,411, filed on Mar. 10, 2017, now Pat. No. 11,006,165, which is a continuation of application No. 15/180,188, filed on Jun. 13, 2016, now Pat. No. 9,641,785, which is a continuation of application No. 14/676,556, filed on Apr. 1, 2015, now Pat. No. 9,380,250, which is a continuation of application No. 13/240,604, filed on Sep. 22, 2011, now Pat. No. 9,019,435.

(51) Int. Cl.
*H04N 21/4363* (2011.01)
*H04N 21/442* (2011.01)
*H04N 21/45* (2011.01)
*H04N 21/485* (2011.01)
*H04N 5/775* (2006.01)
*H04N 21/41* (2011.01)

(52) U.S. Cl.
CPC . *H04N 21/42216* (2013.01); *H04N 21/42227* (2013.01); *H04N 21/43635* (2013.01); *H04N 21/4424* (2013.01); *H04N 21/4516* (2013.01); *H04N 21/485* (2013.01); *H04N 21/41265* (2020.08); *H04N 21/4221* (2013.01); *H04N 21/42221* (2013.01)

(56) References Cited

U.S. PATENT DOCUMENTS

| | | |
|---|---|---|
| 5,614,906 A | 3/1997 | Hayes |
| 5,959,751 A | 9/1999 | Darbee et al. |
| 6,014,092 A | 1/2000 | Darbee et al. |
| 6,225,938 B1 | 5/2001 | Hayes et al. |
| 7,554,614 B2 | 6/2009 | Satou |
| 7,768,421 B2 | 8/2010 | Suzuki et al. |
| 7,827,319 B2 | 11/2010 | Kimura et al. |
| 7,969,514 B2 | 6/2011 | Haughawout et al. |
| 8,342,915 B1 | 1/2013 | Vogel et al. |
| 2005/0160468 A1 | 7/2005 | Rodriguez et al. |
| 2006/0095596 A1 | 5/2006 | Yung et al. |
| 2006/0263091 A1 | 11/2006 | Shimizu |
| 2008/0126591 A1 | 5/2008 | Kwon |
| 2008/0231762 A1 | 9/2008 | Hardacker et al. |
| 2009/0207039 A1 | 8/2009 | Haijima |
| 2010/0013998 A1 | 1/2010 | Mortensen |
| 2010/0118193 A1 | 5/2010 | Boyden et al. |
| 2010/0135279 A1 | 6/2010 | Petersson et al. |
| 2010/0157169 A1 | 6/2010 | Yoshida et al. |
| 2010/0194983 A1 | 8/2010 | Iguchi |
| 2010/0296558 A1 | 11/2010 | Matsushita et al. |
| 2010/0328547 A1 | 12/2010 | Mayorga |
| 2011/0074591 A1 | 3/2011 | Arling et al. |
| 2011/0125301 A1 | 5/2011 | Inoue et al. |
| 2011/0302619 A1 | 12/2011 | Hale et al. |
| 2012/0084452 A1 | 4/2012 | Pettit |

OTHER PUBLICATIONS

Brazilian Patent Office, Office Action issued on Brazilian patent application No. BR1120140069263, dated May 12, 2020, 2 pgs.

US 11,750,872 B2

SYSTEM AND METHOD FOR CONFIGURING CONTROLLING DEVICE FUNCTIONALITY

RELATED APPLICATION INFORMATION

This application claims the benefit of and is a continuation of U.S. application Ser. No. 17/217,587, filed on Mar. 30, 2021, which application claims the benefit of and is a continuation of U.S. application Ser. No. 15/455,411, filed on Mar. 10, 2017, which application claims the benefit of and is a continuation of U.S. application Ser. No. 15/180,188, filed on Jun. 13, 2016, which application claims the benefit of and is a continuation of U.S. application Ser. No. 14/676,556, filed on Apr. 1, 2015, which application claims the benefit of and is a continuation of U.S. application Ser. No. 13/240,604, filed on Sep. 22, 2011, the disclosures of which are incorporated herein by reference in their entirety.

BACKGROUND

Consumer electronic appliances such as set top boxes for receiving and decoding cable and satellite signals, televisions, DVD players, game systems, etc. are well known in the art, as are the hand held controlling devices, for example remote controls, which may be provided for use in issuing commands to these appliances. Frequently, such controlling devices may be "universal," that is, capable of issuing commands suitable for the control of more than one appliance of differing type and/or manufacture.

Increasingly, the interconnections between consumer appliances such as those mentioned above may take the form of digital interfaces based upon, for example, the High-Definition Multimedia Interface (HDMI) standard. The utilization of such digital interconnections may facilitate the exchange of identity information, commands, and capability data between devices and/or the discovery of system topology, which information may be advantageously used when configuring a controlling device.

SUMMARY OF THE INVENTION

This invention relates generally to systems in which a universal controlling device may be configured for use in conjunction with multiple interconnected consumer electronic appliances. In particular, when the interconnection(s) between appliances take the form of a digital interface such as contemplated for example by the HDMI standard, the additional features and functionality of such an interconnection arrangement may be advantageously utilized during configuration and operation of a controlling device associated with that system. The capabilities of individual appliances may be discovered, assessed, and control methods adjusted accordingly, for example substituting direct digital commands issued over the interconnecting bus for wireless infrared or RF command transmissions from a portable controlling device where appropriate. System topologies (e.g., which outputs of which appliance are connected to which inputs of which other appliance(s)) may be established via direct interrogation or by monitoring of digital status during setup, and applied thereafter to the configuration of controlling device and appliance functionality, etc.

In an exemplary embodiment presented herein by way of illustration, such digital discovery, command substitution and topology determination methods are applied to the configuration of a "home" key on a portable controlling device, where the function of such a key is to return an entertainment system to a known state.

BRIEF DESCRIPTION OF THE DRAWINGS

For a better understanding of the various aspects of the invention, reference may be had to preferred embodiments shown in the attached drawings in which.

DETAILED DESCRIPTION

Figure 1:
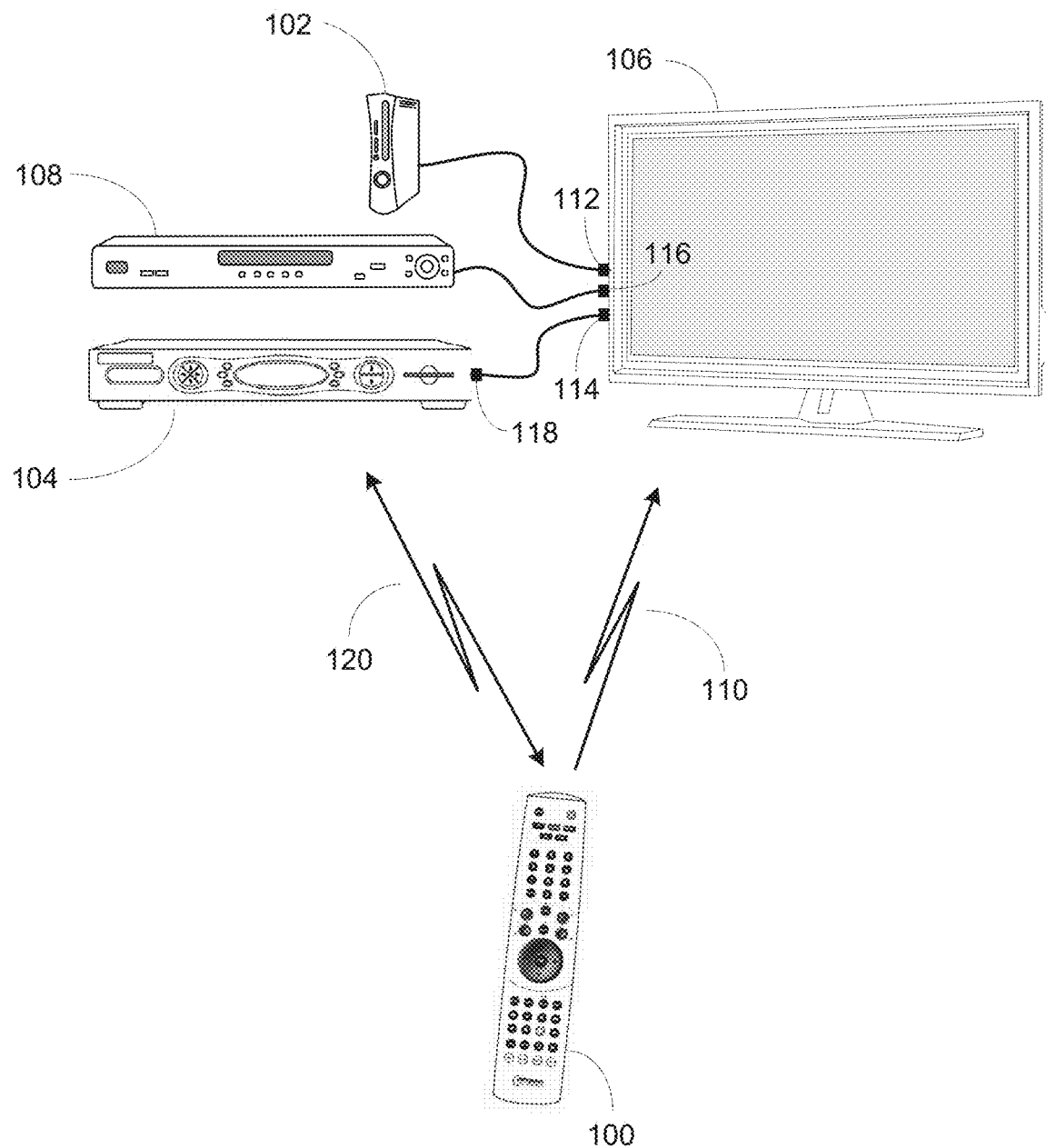
FIG. 1 illustrates an exemplary system in which a controlling device and a set top box configured in accordance with the instant invention may be utilized.

Turning now to FIG. 1, an exemplary system is illustrated wherein a controlling device 100 is configurable to control various appliances, such as a set top box ("STB") 104, a television 106, a DVD player 108, and/or a game console 102. As illustrated, the digital audio/video outputs of appliances 102, 104 and 108, for example output 118 of STB 104, may be attached to digital inputs 112, 114 and 116 of TV 106 in accordance with, for example, the HDMI standard. As is known in the art, the controlling device 100 may be capable of transmitting commands to the appliances, using any convenient IR, RF, Point-to-Point, or networked protocol, to cause the appliances to perform operational functions. Such transmission protocols may be unidirectional 110 or bidirectional 120 as appropriate for the particular appliance to be controlled. In a preferred embodiment, communication between controlling device 100 and at least one of the appliances, e.g., STB 104, comprises a bidirectional link 120.

Figure 2:
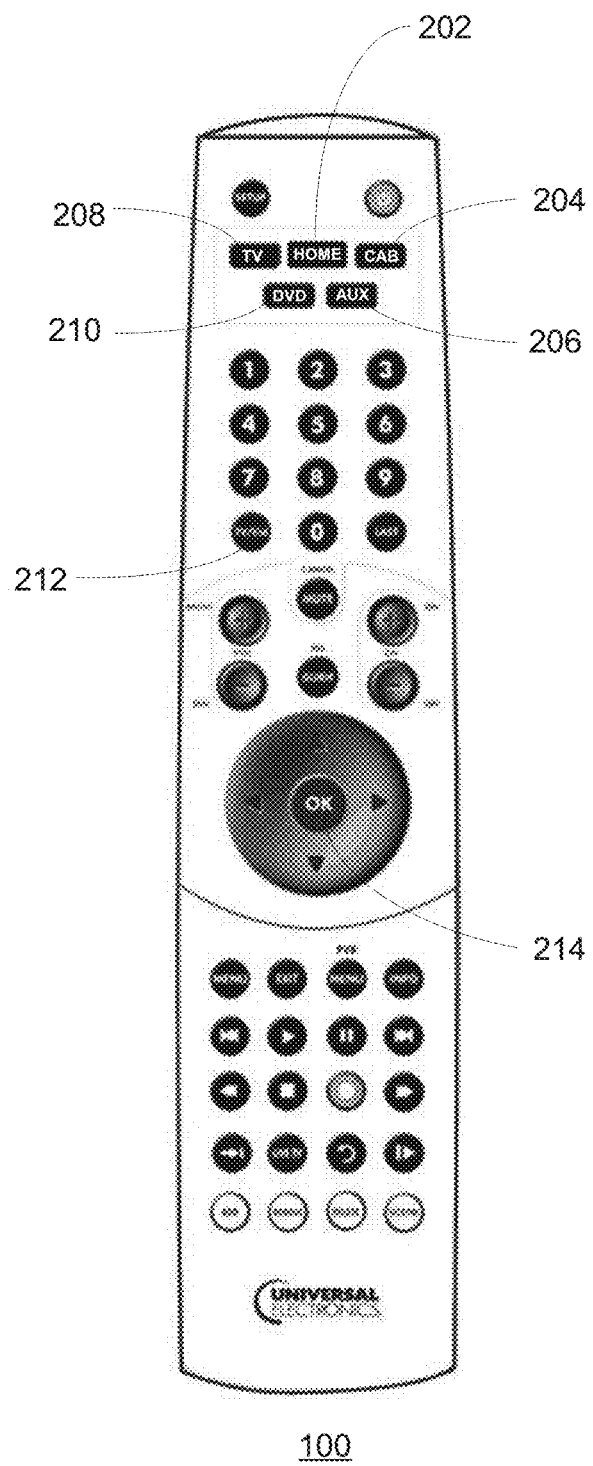
FIG. 2 further illustrates the exemplary controlling device of the system of FIG. 1.

With reference to FIG. 2, an exemplary controlling device 100 may include, inter alia, keys 204 through 210 for selection of an appliance to be controlled, a key 212 or keys for issuing commands to change the active input of a selected appliance, a "select" or "OK" key 214, and a "home" key 202 which may be configured to issue a command or commands intended to restore an appliance to a known state.

Figure 3:
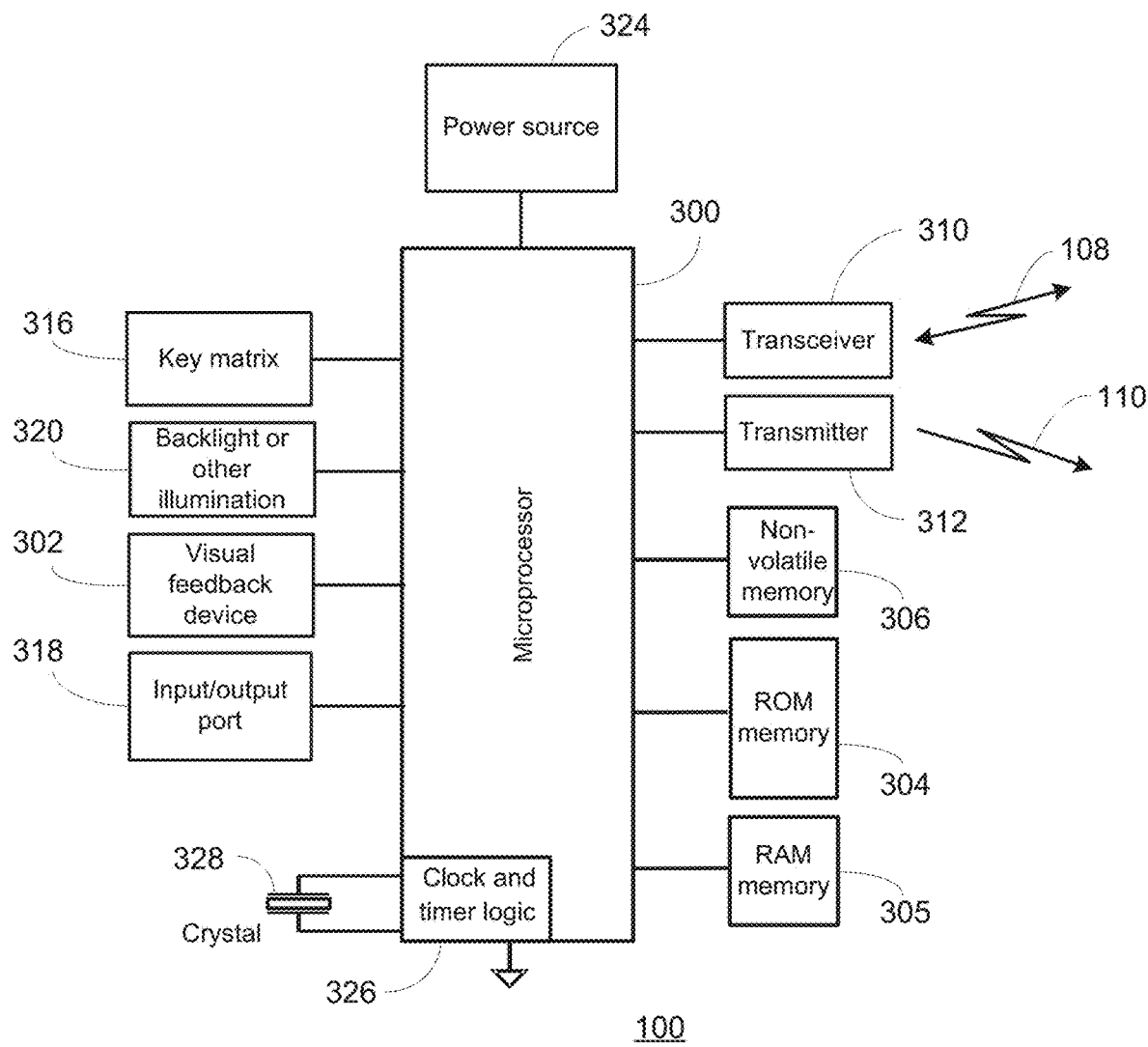
FIG. 3 illustrates a block diagram of exemplary components of the exemplary controlling device of FIG. 1.

Turning now to FIG. 3, for use in commanding the functional operations of one or more appliances an exemplary controlling device 100 may include a processor 300 coupled to a ROM memory 304, a RAM memory 305, a key matrix 316 (e.g., hard keys, soft keys such as a touch sensitive surface overlaid on a liquid crystal (LCD), transmitter circuit(s) 312 and/or transceiver circuit(s) 310 (it being appreciated that elements 310 and 312 may comprise one or more than one transceiver or transmitter, and may utilize IR and/or RF signaling, in any combination as appropriate for a particular embodiment), clock and timer logic 326 with associated crystal or resonator 328, a power source 324 such as a battery, a non-volatile read/write memory 306 such as Flash, battery backed up SRAM, etc., and as required for a particular embodiment means 302 to provide feedback to the user (e.g., one or more LEDs, display, speaker, and/or the like), an input/output port 318 such as a serial interface, USB port, modem, Zigbee, WiFi, or Bluetooth transceiver, etc., and means 320 for backlighting a LCD display or keypad.

As will be understood by those skilled in the art, some or all of the memories 304, 305, 306 may include executable instructions that are intended to be executed by the processor 300 to control the operation of controlling device 100, as well as data which serves to define to the operational software the necessary control protocols and command values for use in transmitting command signals to controllable appliances (collectively, the command data). In this manner, the processor 300 may be programmed to control the various electronic components within the controlling device 100, e.g., to monitor the key matrix 316, to cause the transmission of signals, etc. The non-volatile read/write memory 306, for example an EEPROM, battery-backed up RAM, FLASH, Smart Card, memory stick, or the like type of non-transitory, readable media, may additionally be provided to store setup data and parameters as necessary. While the memory 304 is illustrated and described as a ROM memory, memory 304 can also be comprised of any type of readable media, such as ROM, FLASH, EEPROM, or the like type of non-transitory, readable media. Preferably, read/write memories 304 and 305 are non-volatile or battery-backed such that data is not required to be reloaded after battery changes. In addition, the memories 304, 305 and 306 may take the form of a chip, a hard disk, a magnetic disk, an optical disk, and/or the like. Still further, it will be appreciated that some or all of the illustrated memory devices may be physically combined (for example, a single FLASH memory may be logically partitioned into different portions to support the functionality of memories 304 and 306 respectively), and/or may be physically incorporated within the same IC chip as the microprocessor 300 (a so called "microcontroller") and, as such, they are shown separately in FIG. 3 only for the sake of clarity.

To cause the controlling device 100 to perform an action, the controlling device 100 may be adapted to be responsive to events, such as a sensed user interaction with the key matrix 316, detection of a triggering event via an appropriate trigger sensor, etc. In response to an event, appropriate instructions within the program memory (hereafter the "controlling device operating program") may be executed. For example, when a function key is actuated on controlling device 100, the controlling device operating program may retrieve from the command data stored in memory 304, 305, 306 a command value and transmission protocol corresponding to the actuated function key and, where necessary, current device mode, and transmit that command to an intended target appliance, e.g., TV 106 or STB 104, in a format recognizable by that appliance to thereby control one or more functional operations of that appliance. It will be appreciated that the operating program can be used not only to cause the transmission of commands and/or data to the appliances, but also to perform other operations. While not limiting, other operations that may be performed by the controlling device 100 may include displaying information/data, favorite channel setup, macro key setup, function key relocation, etc. Examples of local operations may be found in U.S. Pat. Nos. 5,481,256, 5,959,751, and 6,014,092. Further, in an exemplary embodiment certain operations may comprise interactions with an appliance such as SIB 104 via bidirectional communication link 120, as will be described in greater detail hereafter.

In an exemplary embodiment, controlling device 100 may be universal, that is, adaptable to issue commands to a multiplicity of appliances of different type and/or manufacture. In such cases, for selecting a set of command data to be associated with an appliance to be controlled, data may be provided to the controlling device 100 that serves to identify an intended target appliance by its type and make (and sometimes model). Such data allows the controlling device 100 to identify the appropriate command data and transmission protocol within a preprogrammed library of command data that is to be used to transmit recognizable commands in a format appropriate for such identified appliances (hereafter a "cod eset"). As is known in the art, identification of an appropriate cod eset may comprise entry of a numeric setup code obtained, for example, from a printed list of manufacturer names and/or models with corresponding code numbers or from a support Web site; may comprise an interaction with an appliance such as STB 104 which culminates in the downloading of command data and/or numeric setup codes to the controlling device; may comprise scanning of bar codes or RFID tags; etc. Since such methods for setting up a controlling device to command the operation of specific home appliances are well-known, these will not be described in greater detail herein. Nevertheless, for additional information pertaining to setup procedures, the reader may turn, for example, to U.S. Pat. Nos. 4,959,810, 5,614,906, 6,225,938, or 7,969,514 all of like assignee and incorporated herein by reference in their entirety.

Figure 4:
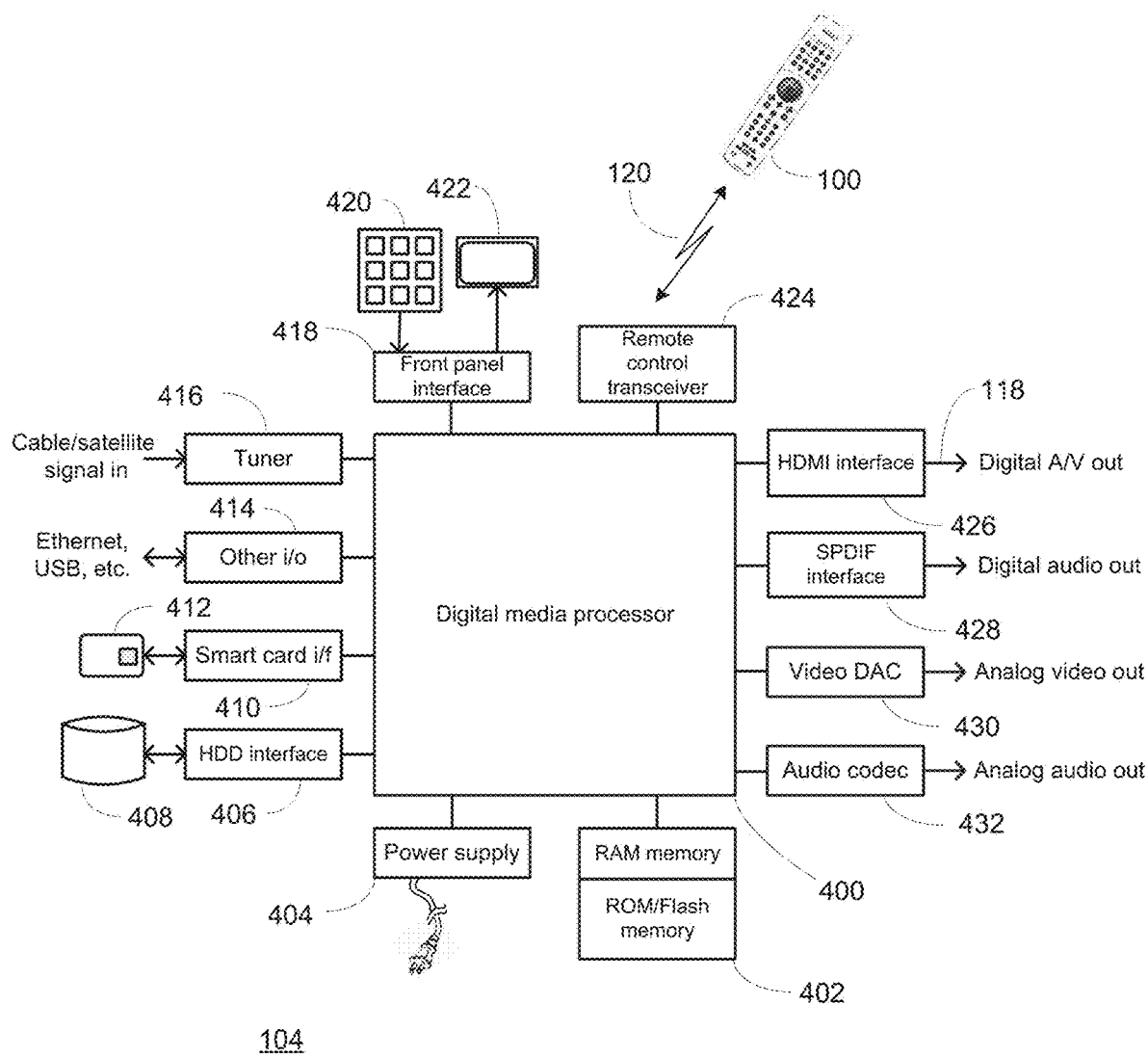
FIG. 4 illustrates a block diagram of exemplary components of the exemplary set top box of FIG. 1.

Turning now to FIG. 4, an exemplary controllable appliance, e.g., STB 104, may include, as needed for a particular application, a processor 400 coupled to a memory 402 which may comprise RAM, ROM, and/or Flash memory; a power supply 404; a hard disk (HDD) interface 406 and associated disk drive 408, for example to support DVR functionality; a smart card and/or PCMIA interface 410 where required to accommodate service enablement/decryption cards 412; other input/output interfaces 414 such as USB, Ethernet, etc.; a front panel interface 418 with associated front panel keypad 420 and display means 422; a remote control receiver or transceiver 424 for reception of signal from a controlling device 100; a digital audio/video output interface 426 such as an HDMI port; a digital audio output 432 such as an SPDIF connection; analog video and audio outputs 430,432; and one or more tuners 416 for receiving and demodulating a cable or satellite signal. As will be appreciated, in general tuner 416 may be capable of receiving both one or more digital media streams comprising program content and a so called out-of-band data stream comprising, for example, program guide information, software updates, etc.

As is known in the art, programming instructions may be stored in a non-transitory readable memory 402 ("STB programming") which when executed by processor 400 may enable the STB appliance 104 to receive and decode digital media and data streams from tuner 416; to store received media content and data on HDD 408 or in memory 402; to output received (from tuner 416) or retrieved (from HDD 408) media content via one or more of the output ports 426,428; to monitor other I/O ports 414 for activity; to receive, decode, and act upon user commands received from controlling device 100 or input via front panel 420; to display program guide information, listings of stored content, or setup and configuration menus at user request and act upon any resulting user input; etc.

Connection of HDMI interface 426 of SIB 104 to a compatible appliance such as TV 106 as illustrated in FIG. 1 may enable exchange of digital information between these appliances in accordance with, for example, the Extended Display Identification Data (EDID), Consumer Electronics Control (CEC), and/or High-bandwidth Digital Content Protection (HDCP) standards. By way of explanation, EDID defines data which may be provided by a digital display appliance such as TV 106 to a video source such as STB 104 to characterize the capabilities and configuration of the display device; CEC defines methods by which appliances may exchange command and control information over an HDMI link; and HDCP provides a method for appliances to authenticate one another and exchange encryption keys in order to effect secure transmission of digital AV media content. Since all of these standards are readily available from their respective standards-setting bodies, for the sake of brevity the features and functionality thereof will be further presented herein only to the extent necessary for a complete understanding of the instant invention.

In a system such as that illustrated in FIG. 1 in which various appliances may be digitally interconnected in accordance with a standard such as HDMI, an appliance, for example STB 104, may utilize information obtainable via such an interconnection to cooperatively participate in the configuration of a universal controlling device such as controller 100. Such cooperation may comprise communication of identifying information regarding the interconnected other appliances to the controlling device, as described for example in co-pending U.S. patent application Ser. No. 12/716,635, of like ownership and incorporated herein by reference in its entirety. Alternatively or in conjunction with such setup, an appliance such as STB 104 may also engage in cooperative determination of system topology and configuration of controlling device features as described herein.

By way of example and without limitation, in an illustrative embodiment of such system topology determination and controlling device configuration it may be considered advantageous for a controlling device 100 offered in conjunction with a STB 104 to be provisioned with a "home" key 202, activation of which may serve to command TV 106 to select as its active input that port which is connected to STB 104, e.g., port 114 in the illustrative example. Provision of such a feature may enable a user who has inadvertently switched TV 106 to a different input source to immediately restore the source to the STB display. While the illustrative example presented herein is in the context of a "home" key 202 which may be specifically provisioned for this purpose, in other embodiments such functionality may be equally advantageously offered in conjunction with an existing appliance selection key such as "Cable" 204 or "DVD" 210, i.e. activation of key 204 may not only place controlling device 100 into an operating mode suitable for controlling STB 104, but may also command TV 106 to select that input port which is associated with viewing STB-sourced content, i.e. port 114; activation of key 210 may not only place controlling device 100 into an operating mode suitable for controlling DVD player 108, but may also command TV 106 to select that input port which is associated with viewing DVD-sourced content, i.e. port 116; etc. Accordingly it will be appreciated that while the methods described below are presented by way of illustration in terms of enabling a "home' 202, such methods may be applied, mutatis mutandis, to the provision of similar functionality to any suitable key of a controlling device. In order to enable such a feature, however, it must first be determined which one of TV inputs 112, 114, 116 is connected to SIB 104, and then determine which explicit input select command, either within the CEC repertoire or within the controlling device cod eset appli- cable to TV 106, may command direct selection of that specific input in order that the controlling device 100 may be configured such that actuation of "home" key 202 may cause an appropriate command to be issued to TV 106.

Accordingly, after controlling device 100 has been initially configured to command operation of appliances 102 through 108, preferably in conjunction with STB 104 as described for example in the above referenced U.S. Pat. No. 7,969,514 or in U.S. patent application Ser. No. 12/716,635, in an exemplary embodiment the STB programming of appliance 104 and the controlling device operating program of controlling device 100 may cooperatively execute a series of steps to configure the functionality of "home" key 202, coordinated where necessary over bidirectional communication link 120, as will now be described in conjunction with FIGS. 5 and 6.

Figure 5:
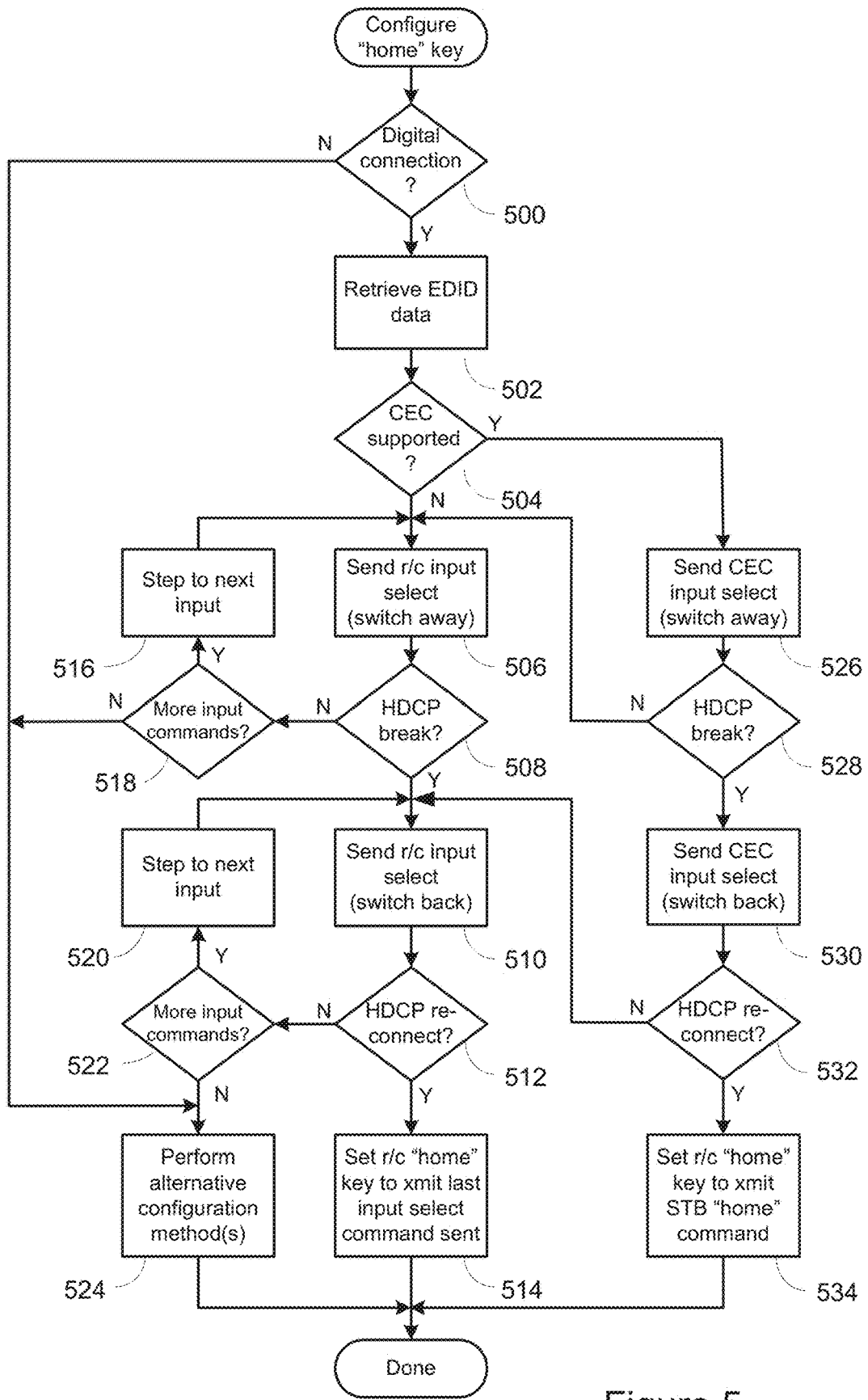
FIG. 5 illustrates an exemplary series of steps which may be performed when configuring the controlling device of FIG. 1.

With reference to FIG. 5, at step 500 the STB programming may initially determine if a display appliance, e.g., TV 106, is in fact connected to HDMI port 118. If not, retrieval of HDMI-available digital information from the appliance may not be possible, and accordingly the configuration process may continue at step 524 whereat other configuration methods may be attempted, for example as described hereafter in conjunction with FIG. 6. If however an appliance is determined to be connected to HDMI port 118, at step 502 that appliance's EDID data may be retrieved. The EDID data may indicate, inter alia, which HDMI port of the connected appliance is being used to communicate with STB 104, e.g., port 114 of TV 106 in the illustrative example. Next, at step 504, the STB programming may determine whether the attached appliance supports CEC control over the HDMI connection. This determination may be made based on information contained in the retrieved EDID, may be empirically derived based on the appliance's response (or lack thereof) to a CEC query, may be obtained by referencing a local or remote database of appliance capabilities using appliance identity information embedded in the EDID or previously gathered during initial setup of controlling device 100, or any other suitable method. If it is determined that the appliance does in fact support CEC control, than at step 526 a CEC command may be issued via the HDMI interconnection to cause the appliance to select a different input as its current AV source. Thereafter, at step 528 the STB programming may determine if an HDCP break has occurred as a result of the command issued at step 526. By way of explanation, whenever a digital pathway is established between an HDCP compliant source device and an HDCP compliant sink device, an authentication process and exchange of encryption keys occurs. Since many sink devices are capable of supporting only one HDCP stream at a time, when sink device inputs are switched the HDCP logical connection with the former source device may be terminated and authentication cancelled. If such an HDCP break is detected, then at step 530 the STB programming may next issue a CEC input select command to return the appliance input to the EDID-indicated HDMI port to which the STB is purportedly connected. Thereafter, at step 532 the STB programming may determine if an HDCP reconnect has occurred as a result of the command issued at step 530. If so, it has been established that the appliance, TV 106 in the illustrative example, may be successfully switched back to the correct input for display of STB output via the use of a CEC command issued over the HDMI interconnection. Accordingly, at step 534 a message may be communicated to controlling device 100 to configure "home" key 202 to transmit a command to STB 104, which command when received by STB 104 will cause issuance of the just-verified CEC input select command to TV 106. As will be appreciated, in some embodiments this may in fact comprise the default configuration for the controlling device "home" key function, in which instances step 534 may be omitted. If either the HDCP break at step 528 or HDCP reconnect at 532 is unsuccessful, it may be assumed that input switching via CEC commands is not adequately supported by the appliance, e.g. TV 106, and as indicated in FIG. 5 the STB programming may continue at an appropriate point in the controlling device input select command test sequence described below.

Returning to step 504, if the STB programming determines that the attached appliance does not support CEC control, at step 508 it may communicate with controlling device 100, for example via bidirectional communication link 120, in order to request transmission of a preparatory input selection command to the attached appliance, e.g., TV 106. Such a preparatory command, transmitted at step 506, may comprise a command to select an input to which the STB 104 is not connected. By way of example, in the illustrative system this may comprise a command intended to cause TV 106 to switch away from the EDID-indicated HDMI port 114 to which STB 104 is connected, e.g., to one of ports 112 or 116. Thereafter, at step 508 the STB programming may determine if an HDCP break has occurred as a result of the command issued at step 506. If not, at steps 518 and 516 other available input selection commands available in the cod eset applicable to TV 106 may be sequentially tested. If no command code is successful in initiating and HDCP break, the STB programming may continue at step 524 where alternative configuration methods may be attempted as described hereafter. If however an HDCP break is successfully initiated, at steps 510, 512, 522, 520 the STB programming may next attempt to determine the input select command which will restore TV 106 to the input port 114 to which STB 104 is connected. As illustrated, this may take the form of repetitive requests to controlling device 100 to cause sequential issuance of possible input select command to TV 106 until an HDCP reconnect is detected by the STB programming. Advantageously, the sequence in which input select commands are issued to TV 104 may be determined in part by the HDMI port number reported by TV 106 as part of the EDID data retrieved at step 502. By way of example, if the EDID data indicates that the connection 114 is to HDMI port number three of TV 106 and a command labeled "HDMI 3" is present in the controlling device codeset applicable to TV 106, then that command may be selected as the first to be attempted. When an HDCP reconnect status is detected by the STB programming, at step 514 a message may be communicated to controlling device 100 to configure "home" key 202 to transmit the TV input select command code last issued in the test sequence, and configuration is complete. If however no HDCP reconnect has been detected upon exhaustion of possible input select codes, at step 524 alternative configuration methods may be attempted, for example such at that described hereafter in conjunction with FIG. 6.

Figure 6:
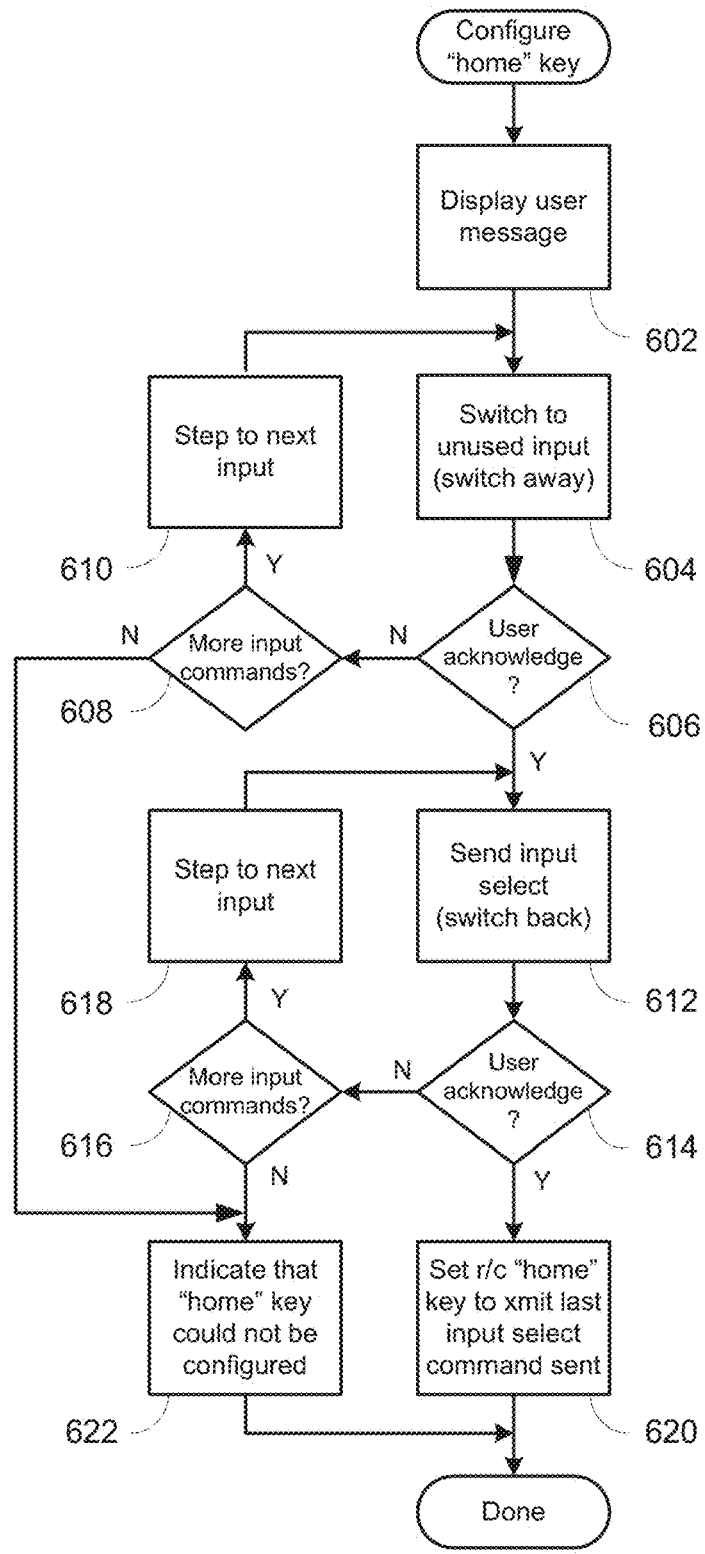
FIG. 6 illustrates a further exemplary series of steps which may be performed when configuring the controlling device of FIG. 1.

In those cases where a display device such as a TV is not attached to an STB via a digital connection, for example is connected to analog AV outputs 430,432 of STB 104; or where a display device is attached via a digital connection but may not be compatible with the methods described above conjunction with FIG. 5, for example a display device which supports multiple concurrent HDCP sessions and accordingly does not reliably report HDCP session termination when an input is switched, an exemplary alternate configuration method will now be described in conjunction with FIG. 6. As will become apparent, in the illustrative method user feedback may be used in lieu of the HDCP status change detections of the previous methods. This process may commence at step 602 with the STB programming causing display of a message on the TV screen which message may prompt the user to take the required actions. For example, in the illustrative method, the message may request that the user actuate the "OK" key 214 of controlling device 100 once when the displayed messages disappears and a second time when the displayed message reappears. Thereafter, at step 604 the STB programming may request that the controlling device 100 issue a command to cause selection of an unused input of the TV device. Advantageously, the particular input command used may be selected from those available in the current cod eset in such a manner as to maximize the probability of the selected input being unused. For example in the case of TV 104 which is known to be interconnected via a digital interface, such an input selection command may be one presumed to be associated with an analog input, for example an "antenna" or a "composite video" input selection command. At step 606 it is then determined, after a suitable delay, whether the user has acknowledged disappearance of the displayed message, i.e., the STB has received a controlling device transmission comprising the command associated with "OK" key 214. If not, the sequence is repeated using a different input select command, via steps 608 and 610. Once the user has confirmed in this manner that the selected TV input is no longer that which is connected to the output of the STB, at steps 612 through 618 the STB programming may cause sequential transmission of available input selection commands until a second user acknowledgement is received to indicate that the selected TV input is once again that input which is connected to the STB, as evidenced by reappearance of the displayed message. Again, the order in which input select commands are tested may be advantageously adjusted according to known factors, for example starting with the EIDID indicated port in the case of a digitally attached device; starting with known non-HDMI, non-DVI inputs in the case of an analog attached device; etc. Upon receiving the second user acknowledgement, at step 620 the STB programming may forward an indication to controlling device 100 that the TV input select command code last issued in the test sequence should be assigned to "home" key 202, and configuration is complete. If however a first or second user acknowledgement is not received prior to exhaustion of all possible input selection commands present in the current codeset, then at step 622 an indication may be issued to the user that automatic configuration of the "home" key is not possible. To ensure that it reaches the user regardless of the current state of the TV inputs, such an error indication may comprise, for example, not only an attempted display on the TV screen, but also a message on STB front panel 422, activation of user feedback mechanism 302 of controlling device 100, etc.

While various concepts have been described in detail, it will be appreciated by those skilled in the art that various modifications and alternatives to those concepts could be developed in light of the overall teachings of the disclosure. For example, while the majority of the steps of the exemplary method of FIGS. 5 and 6 are described as performed by the SIB programming, it will be appreciated that in other embodiments many of these steps may be equally well performed by the controlling device operating program. Additionally, while presented by way of illustration in the context of configuration of a "home" key of a universal controlling device, it will be appreciated that the methods described herein may be generally applied to the configuration and operation of digitally interconnected systems of electronic appliances, for example without limitation the configuration of activity-specific operations such as "Watch a movie", "Listen to music", "Browse the web", etc.; the determination of favorite equipment configuration settings and restoration thereto; the capture of individual user preferences; etc.

Further, while described in the context of functional modules and illustrated using block diagram format, it is to be understood that, unless otherwise stated to the contrary, one or more of the described functions and/or features may be integrated in a single physical device and/or a software module, or one or more functions and/or features may be implemented in separate physical devices or software modules. It will also be appreciated that a detailed discussion of the actual implementation of each module is not necessary for an enabling understanding of the invention. Rather, the actual implementation of such modules would be well within the routine skill of an engineer, given the disclosure herein of the attributes, functionality, and inter-relationship of the various functional modules in the system. Therefore, a person skilled in the art, applying ordinary skill, will be able to practice the invention set forth in the claims without undue experimentation. It will be additionally appreciated that the particular concepts disclosed are meant to be illustrative only and not limiting as to the scope of the invention which is to be given the full breadth of the appended claims and any equivalents thereof.

All patents cited within this document are hereby incorporated by reference in their entirety.

What is claimed is:

1. A first controllable appliance, comprising:
   a receiver for receiving commands from a controlling device;
   a transmitter;
   a processing device coupled to the receiver and the transmitter; and
   a memory storing instructions executable by the processing device to cause the first controllable appliance to perform steps comprising:
   determine a communications port of a second controllable appliance to which the first controllable appliance is communicatively coupled; and
   transmit, via the transmitter, a data to the controlling device wherein the data is usable by the controlling device to automatically configure an input element of the controlling device whereupon a subsequent activation of the input element of the controlling device will cause a transmission of a command for causing the second controllable appliance to make active the communications port of the second controllable appliance to which the first controllable appliance is determined to be communicatively coupled.

2. The first controllable appliance as recited in claim 1, wherein the programming causes the first controllable appliance to determine that a High-bandwidth Digital Content Protection (HDCP) reconnect has occurred to determine the communications port of the second controllable appliance to which the first controllable appliance is communicatively coupled.

3. The first controllable appliance as recited in claim 1, wherein the programming causes the first controllable appliance to use Extended Display Identification Data (EDID) received from the second controllable appliance to determine the communications port of the second controllable appliance to which the first controllable appliance is communicatively coupled.

4. The first controllable appliance as recited in claim 1, wherein the first controllable appliance comprises a set-top box and the second controllable appliance comprises a television.

5. The first controllable appliance as recited in claim 4, wherein the communications port of the second controllable appliance to which the first controllable appliance is communicatively coupled comprises a High-Definition Multimedia Interface (HDMI) port.

6. A system, comprising:
   a controlling device; and
   a first controllable appliance;
   wherein the first controllable appliance is programmed to determine a communications port of a second controllable appliance to which the first controllable appliance is communicatively coupled and to transmit a data to the controlling device which indicates to the controlling device the communications port of the second controllable appliance to which the first controllable appliance is determined to be communicatively coupled; and
   wherein the controlling device is programmed to use the data indicative of the communication port of the second controllable appliance to which the first controllable appliance is determined to be communicatively coupled to automatically configure an input element of a user interface device of the controlling device whereupon a subsequent activation of the input element of the user interface device will cause a transmission by the controlling device of a command for causing the second controllable appliance to make active the communications port of the second controllable appliance to which the first controllable appliance device is determined to be communicatively coupled.

7. The system as recited in claim 6, wherein the command comprises a command for indirectly causing the second controllable appliance to make active the communications port of the second controllable appliance to which the first controllable appliance device is determined to be communicatively coupled.

8. The system as recited in claim 7, wherein the command is formatted for reception by the first controllable appliance.

9. The system as recited in claim 6, wherein the command comprises a command for directly causing the second controllable appliance to make active the communications port of the second controllable appliance to which the first controllable appliance device is determined to be communicatively coupled.

10. The system as recited in claim 6, wherein the first controllable appliance is programming to determine that a High-bandwidth Digital Content Protection (HDCP) reconnect has occurred to determine the communications port of the second controllable appliance to which the first controllable appliance is communicatively coupled.

11. The system as recited in claim 6, wherein the first controllable appliance is programmed to use Extended Display Identification Data (EDID) received from the second controllable appliance to determine the communications port of the second controllable appliance to which the first controllable appliance is communicatively coupled.

12. The system as recited in claim 6, wherein the first controllable appliance comprises a set-top box and the second controllable appliance comprises a television.

13. The system as recited in claim 12, wherein the communications port of the second controllable appliance to which the first controllable appliance is communicatively coupled comprises a High-Definition Multimedia Interface (HDMI) port.

14. The system as recited in claim 6, wherein the first controllable appliance is programmed to use a Consumer Electronics Control (CEC) query to determine the communications port of the second controllable appliance to which the first controllable appliance is communicatively coupled.

15. The system as recited in claim 6, wherein the first controllable device comprises a media source device and the second controllable appliance comprises a media sink device.

16. The system as recited in claim 15, wherein the media source device comprises a removeable media playing device and the media sink device comprises a television.

* * * * *